(12) United States Patent
Nakamura et al.

(10) Patent No.: US 8,067,080 B2
(45) Date of Patent: Nov. 29, 2011

(54) OPTICAL RECORDING MEDIUM

(75) Inventors: Yuki Nakamura, Machida (JP);
Masahiro Hayashi, Yokohama (JP);
Satoshi Mizukami, Sagamihara (JP);
Tohru Yashiro, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 694 days.

(21) Appl. No.: 12/282,821

(22) PCT Filed: Mar. 14, 2007

(86) PCT No.: PCT/JP2007/055790
§ 371 (c)(1),
(2), (4) Date: Sep. 12, 2008

(87) PCT Pub. No.: WO2007/105829
PCT Pub. Date: Sep. 20, 2007

(65) Prior Publication Data
US 2009/0053456 A1 Feb. 26, 2009

(30) Foreign Application Priority Data

Mar. 16, 2006 (JP) ................................ 2006-073440
Mar. 6, 2007 (JP) ................................ 2007-055685

(51) Int. Cl.
*G11B 7/24* (2006.01)
(52) U.S. Cl. ............. 428/64.8; 430/270.16; 430/270.21; G9B/7.151; G9B/7.156
(58) Field of Classification Search .................. 428/64.4, 428/64.8; 430/270.16, 270.21; G9B/7.151, G9B/7.156
See application file for complete search history.

(56) References Cited

U.S. PATENT DOCUMENTS 6,660,867 B2 * 12/2003 Shimizu et al. ............... 548/105
(Continued)

FOREIGN PATENT DOCUMENTS

EP 1496509 A2 * 1/2005
JP 2000-311384 11/2000
(Continued)

*Primary Examiner* — Gerard Higgins
(74) *Attorney, Agent, or Firm* — Cooper & Dunham LLP

(57) ABSTRACT

Provided is an optical recording medium including, in sequence:
a first substrate; a first information recording layer; an intermediate layer; a second information recording layer; and a second substrate having wobble convex portions on its surface,
wherein information is recorded on or reproduced from the first information recording layer and second information recording layer by irradiation with a laser beam from a first information recording layer side,
wherein the second information recording layer includes, over the second substrate, a light reflective layer, a dye recording layer, and an inorganic protective layer,
wherein the inorganic protective layer has a thickness of 3 nm to 40 nm, and wherein the dye recording layer includes a cyanine compound expressed by General Formula (I) and a squarylium compound expressed by General Formula (II):

General Formula (I)

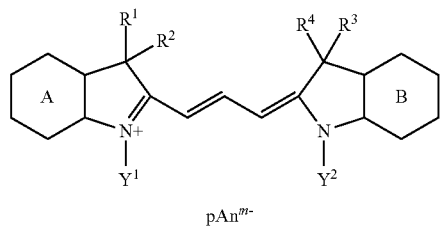

General Formula (II)

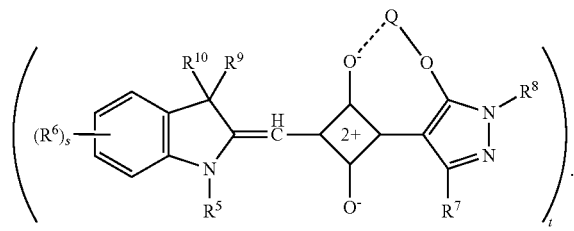

9 Claims, 3 Drawing Sheets

| U.S. PATENT DOCUMENTS | | | | |
|---|---|---|---|---|
| 6,794,005 B2 * | 9/2004 | Noguchi et al. | | 428/64.1 |
| 7,425,401 B2 * | 9/2008 | Yano et al. | | 430/270.21 |
| 7,553,604 B2 * | 6/2009 | Yano et al. | | 430/270.21 |
| 2005/0031993 A1 * | 2/2005 | Yano et al. | | 430/270.21 |
| 2006/0286483 A1 * | 12/2006 | Yano et al. | | 430/270.21 |

| FOREIGN PATENT DOCUMENTS | | |
|---|---|---|
| JP | 2003-231359 | 8/2003 |
| JP | 2003-303447 | 10/2003 |
| JP | 2005-54150 | 3/2005 |
| JP | 2006-48892 | 2/2006 |

* cited by examiner

$I_{14H}$: Reflectivity after Recording

Modulation Degree: $I14/I14H = (I_{14H} - I_{14L})/I_{14H}$

OPTICAL RECORDING MEDIUM

TECHNICAL FIELD

The present invention relates to recordable optical recording media capable of recording and regenerating information, in which light beam is irradiated onto dye-recording layers to cause optical change such as of transmittance and reflectance, in particular to two-layer DVDs (Digital Video Disc or Digital Versatile Disc) with two recordable information recording layers.

BACKGROUND ART

Recordable DVDs such as DVD+RW, DVD+R, DVD-R, DVD-RW and DVD-RAM are commercially available in addition to playback-only optical recording media such as DVD-ROM. The DVR+R and DVD+RW are developed on the basis of conventional CD-R and CD-RW (recording compact disc) such that the recording density (track pitch, signal mark length) and substrate thickness are compatible between CD and DVD conditions in order to assure the reproduction compatibility with playback-only DVD.

For example, DVD+Rs have a construction, similarly with CD-Rs, that an optical recording layer is provided on a substrate by way of spin-coating a cyanine or an azo dye, an information recording substrate with a light reflective layer of a metal film is laminated through an adhesive at the back side of the optical recording layer.

In the construction, dye substances or the compounds are typically utilized to form the optical recording layer or the dye recording layer. CD-Rs have specific reflectance as high as 65% or more as defined by specifications in terms of CDs. In order that such a construction exhibits higher reflectance, the optical absorption layer should represent a specific range of complex refractive index at the recording-reproducing wavelength, and the dye should represent a proper optical absorption property, as also been required for DVDs.

On the other hand, there is proposed a read-only DVD with two layers of image recording layer as the recording unit in order to increase the recording capacity. A translucent layer of a first information recording layer is formed at inner surface of a first substrate, and a reflective layer of a second information recording layer is formed at inner surface of a second substrate. The translucent layer is formed of a dielectric or thin-metal film, and the reflective layer is formed of a metal film.

Convexo-concave recording marks are formed at the substrate surface on which the translucent layer and the reflective layer are formed; the first substrate and the second substrate are laminated through a transparent intermediate layer of a UV-ray curable resin, thereby recording signals can be read by making use of reflection-interference effects on reproducing laser light incident from the transparent side of the first substrate.

Since signals can be read from two information recording layers, the recording capacity may be up to about 8.5 GB. The thicknesses of the first and second substrates are about 0.6 mm respectively, and the thickness of the transparent intermediate layer is about 50 μm.

The first information recording layer is designed to have a reflectance of about 30%; the laser light for reproducing the second information recording layer is reflected at the second information recording layer after decaying about 30% of the initial light amount at the first information recording layer, then further decaying at the first information recording layer, and emitting from the disc. A laser light of reproducing light is narrowed to focus at the first or second information recording layer and the reflected light is detected, thereby the signals at the information recording layer can be reproduced. The wavelength of the laser light for information reproduction is about 650 nm in cases of DVDs.

Recently, a recordable DVD has been developed that has two dye-recording layers, in which a first dye recording layer and a first translucent reflective layer are laminated on a first substrate, on which grooves having been formed, to form a first information recording layer; a UV ray curable resin is coated on the first information recording layer, and a stamper is contacted to the uncured resin; the resin is cured by UV irradiation and peeled thereby to transfer grooves of a second recording layer is transferred to which a second dye recording layer and an light reflective layer is laminated to form a second information recording layer, then the entire is laminated to a second substrate. The two-layer recordable DVD is commercially available as 2P (Photo Polymerization) type.

In addition, a two-layer recordable DVD of IS (Inversed Stack) type is also commercially available, which is produced in a manner that a first dye recording layer and a first translucent reflective layer are laminated on a first substrate, on which grooves having been formed, to form a first information recording layer; a light reflective layer, a second dye recording layer, and a protective layer are laminated on a second substrate, on which grooves having been formed, to form a second information recording layer; then these laminates are further laminated by use of a UV curable resin.

Patent Literature 1 discloses an optical recording medium having a construction that a second barrier layer is provided between an intermediate or adhesive layer and a second optical absorption layer; in Examples thereof, only Au is exemplified as the material of the second barrier layer.

However, employment of metals tends to increase the absorption coefficient "k" of complex refractive index (n−ik), which typically makes impossible to take high reflectance and sufficient modulation degrees when being recorded on two image recording layers. Moreover, the literature describes in paragraph 0039 that the material of the second barrier layer preferably has "k" of no less than 0.1; as such, the literature describes no technical idea in relation to absorption coefficient as low as below 0.05 as described in the present invention.

Patent Literature 2 discloses an optical recording medium that has a laminate structure between a first recording disc and a second recording disc, in which the first recording disc is formed by laminating an organic dye recording layer and an light reflective layer on an optical transparent substrate and the second recording disc is formed by laminating an optical reflective layer, an organic dye recording layer, and a dye protective layer on an optical transparent substrate; however, no description appears with respect to the dye utilized in the organic dye recording layer.

Patent Literature 3 describes in relation to a thermal deposition temperature and a maximum absorption wavelength of dyes, however, also describes that sufficient modulation degree of recording signals is hardly obtainable when the thickness of the protective layers is below 80 nm.

Patent Literature 1: Japanese Patent Application Laid-Open (JP-A) No. 2000-311384
Patent Literature 2: JP-A No. 2003-303447
Patent Literature 3: JP-A No. 2006-48992

DISCLOSURE OF INVENTION

Optical recording media, equipped with a dye-recording layer formed by a conventional spin-coat process, have a dye film that is thicker at concave portions than that at convex portions of substrates, thus pits may be suppressed to extend toward adjacent tracks due to thermal-insulation effect at convex portions when recording into concave portions of recording tracks; meanwhile, in cases where wobble convex portions are provided on a substrate (and also address information as required), a second information recording layer on the second substrate contains at least a reflective layer, an upper protective layer, a second dye-recording layer, and a lower protective layer in this order, and information is recorded on convex portions of the second substrate as recording tracks, thus the average film thickness should be increased compared to usual recording at concave portions in order to take sufficiently a signal amplitude and a reflectance.

In addition, the film thickness of dye-recording layers formed at convex portions is similar to or somewhat thinner than the film thickness of dye-recording layers formed at concave portions between the tracks, therefore, heat due to laser irradiation and/or dye decomposition transfers to adjacent tracks, resulting in higher jitter and/or deterioration of wobble signal quality.

The present invention aims to solve these problems described above, and to provide an optical recording medium, for recording and regenerating at one side, that makes use of a second information recording layer with superior recording signal properties.

The present invention is based on our founding insinuated above, and the purpose may be attained by the invention below.

The present invention provides an optical recording medium comprising, in sequence:

a first substrate; a first information recording layer; an intermediate layer; a second information recording layer; and a second substrate having wobble convex portions on its surface, wherein information is recorded on or reproduced from the first information recording layer and second information recording layer by irradiation with a laser beam from a first information recording layer side, wherein the second information recording layer includes, over the second substrate, a light reflective layer, a dye recording layer, and an inorganic protective layer, wherein the inorganic protective layer has a thickness of 3 nm to 40 nm, and wherein the dye recording layer includes a cyanine compound expressed by General Formula (I) and a squarylium compound expressed by General Formula (II);

General Formula (I)

in which, ring A and ring B are each a benzene ring or a naphthalene ring that may have substituent(s); among $R^1$ to $R^4$, adjacent two groups of $R^1$ and $R^2$, $R^2$ and $R^4$, or $R^3$ and $R^4$ are a benzyl group or all of $R^1$ to $R^4$ are each a benzyl group, and, in the former case, the other two groups of $R^1$ to $R^4$ are each an alkyl group having 1 to 4 carbon atoms or connect each other to form a three- to six-membered ring; $Y^1$ and $Y^2$ are each independently an organic group with a carbon number of 1 to 30; $An^{m-}$ represents an anion with a valency of "m", and the "m" is an integer of 1 or 2, "p" is a factor for neutralization;

General Formula (II)

in which, $R^5$ represents a hydrogen atom, an alkyl group that may have substituent(s), an aralkyl group that may have substituent(s), or an aryl group that may have substituent(s); $R^6$ represents a halogen atom, an alkyl group that may have substituent(s), an aralkyl group that may have substituent(s), an aryl group that may have substituent(s), a nitro group, a cyano group, or an alkoxy group that may have substituent(s); "s" represents an integer of 0 to 4, when "s" represents an integer of 2 to 4, the respective $R^6$s may be identical or different each other, and adjacent two $R^6$s may bind with adjacent two carbon atoms to form an aromatic ring that may have substituent(s); $R^7$ and $R^8$ are each a group selected independently from the group consisting of alkyl groups that may have substituent(s), aralkyl groups that may have substituent(s), aryl groups that may have substituent(s), and heterocyclic groups that may have substituent(s); $R^9$ and $R^{10}$ are each a group selected independently from the group consisting of alkyl groups that may have substituent(s), aralkyl groups that may have substituent(s), and aryl groups that may have substituent(s), $R^9$ and $R^{10}$ may bind each other to form a cycloaliphatic hydrocarbon ring or a heterocyclic ring; Q represents a metal atom capable of coordinating; "t" is an integer of 2 or 3.

Preferably, the amount (W1) of the cyanine compound expressed by General Formula (I) and the amount (W2) of the squarylium compound expressed by General Formula (II) satisfy the following relation: 0.2<W1/(W1+W2)<0.8.

Preferably, the thermal decomposition temperature of the cyanine compound is 200° C. to 240° C., and the thermal decomposition temperature of the squarylium compound is 240° C. to 300° C.

Preferably, the maximum absorption wavelength λmax, of the cyanine compound is 610 nm to 630 nm, and λmax of the squarylium compound is 560 nm to 620 nm.

Preferably, the main ingredient of the inorganic protective layer is zinc sulfide.

Preferably, the inorganic protective layer comprises a transparent conductive oxide.

Preferably, the transparent conductive oxide is at least one of indium oxide, zinc oxide, gallium oxide, tin oxide, niobium oxide and $InCaO_3(ZnO)_m$ (m: natural number)

Preferably, the light reflective layer is formed from Ag or Ag alloys, and has a thickness of 80 nm to 200 nm.

Preferably, the recording on the second information recording layer by use of laser light irradiation deforms the interface, between the dye recording layer and the inorganic protective layer, at the sites corresponding to pits of the second information recording layer.

In accordance with the present invention, optical recording media having two information recording layers are provided, in which the second information recording layer, at back side from incident light, comprises a dye recording layer containing a cyanine compound and a squarylium compound with specific structures and optimum optical absorption/thermal decomposition properties and also an inorganic protective layer with a certain thickness, thereby sufficient reflectance and modulation degrees may be attained, and cross talk may be decreased between adjacent tracks by virtue of suppressing marks to spread at recording, consequently, optical recording media with excellent recording properties may be provided even under high-speed recording.

BEST MODE FOR CARRYING OUT THE INVENTION

The present invention will be explained in the following:

In the inventive optical recording medium having two layers of a first and a second information recording layers, the second information recording layer contains an light reflective layer, a dye recording layer, and an inorganic protective layer; the dye recording layer comprises at least a cyanine compound with a specific structure and property and a squarylium compound with a specific structure and property, and the film thickness of the inorganic protective layer is defined to be 3 to 40 nm, consequently, cross talk may be decreased between adjacent tracks, recording properties may be improved at higher velocities in particular, and the preservation durability may be enhanced.

In cases of conventional DVD±Rs and two-layer recording media, the first recording layers of front side are provided with a dye recording layer of 60 to 100 nm thick at the surface with grooves of 100 to 200 nm deep by a coating process. As a result, the film thickness of dye recording layers for recording information by light irradiation comes to be relatively thick at the groove portions, meanwhile, the film thickness of dye recording layers recording no information comes to be relatively thin at the land portions, therefore, the thermal interference is also decreased between adjacent grooves.

The thermal interference tends to exhibit more significant effects as the recording-laser power comes to larger, thus degrading signal quality i.e. jitter. As such, it is known that the higher is the recording speed, the higher power is required and the thermal interference comes to be a critical effect.

In order to form the second dye recording layer at back side, viewed from incident light side, of the optical recording medium in the inventive construction, it is necessary that a light reflective layer is sputtered on a substrate, a dye recording layer is coated, and a protective layer is spattered in the reverse order with conventional CD-Rs and DVD±Rs.

Consequently, among land and groove portions existing alternatively on the substrate, the information is recorded in the dye-recording layer at land portions which being at front side viewed from recording/regenerating pickups. Since the film thickness of dye recording layers is relatively thick at the groove portions, the effect of thermal interference is more significant on the adjacent lands, and the jitter of recording quality tends to rise.

Accordingly, employment of a cyanine compound and a squarylium compound that have a specific structure and optimized optical absorption/thermal decomposition properties as the second dye recording layer as well as an inorganic protective layer with a specific film thickness, as defined in the present invention, may suppress mark dispersion at recording, thus an optical recording medium may be provided that is suited to high-speed recording.

The cyanine compound expressed by General Formula (I) is characterized by lower decomposition temperatures and proper wavelengths.

Examples of substituents in benzene or naphthalene rings, expressed by ring A or B in General Formula (I), that may have substituent(s) include halogens such as fluorine, chlorine, bromine and iodine; alkyl groups such as methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl and 2-ethylhexyl; aryl groups such as phenyl, naphthyl, 2-methylphenyl, 3-methylphenyl, 4-methylphenyl, 4-vinylphenyl and 3-isopropylphenyl; alkoxy groups such as methoxy, ethoxy, propoxy, isopropoxy, butoxy, sec-butoxy and tert-butoxy, alkylthio groups such as methylthio, ethylthio, propylthio, isopropylthio, butylthio, sec-butylthio and tert-butylthio; nitro group and cyano group.

As for groups expressed by $R^1$ to $R^4$, $R^1$ and $R^2$ are each a benzyl group, $R^2$ and $R^4$ are each a benzyl group, $R^3$ and $R^4$ are each a benzyl group, or all of $R^1$ to $R^4$ are each a benzyl group. When $R^1$ to $R^4$ are ones other than benzyl group, alkyl groups of carbon number 1 to 4, or $R^1$ and $R^2$ or $R^3$ and $R^4$ may connect to form a three- to six-membered ring.

Examples of the alkyl groups include methyl, ethyl, propyl, isopropyl, butyl, sec-butyl, tert-butyl and isobutyl; examples of the three- to six-membered rings include cyclopropane-1,1-diyl, cyclobutane-1,1-diyl, 2,4-dimethylcyclobutane-1,1-diyl, 3-dimethylcyclobutane-1,1-diyl, cyclopentane-1,1-diyl, cyclohexane-1,1-diyl, tetrahydropyran-4,4-diyl, cyane-4,4-diyl, piperidine-4,4-diyl, N-substituted piperidine-4,4-diyl, morpholine-2,2-diyl, morpholine-3,3-diyl, N-substituted morpholine-2,2-diyl, N-substituted morpholine-3,3-diyl, and the like; the substituent of the N-substituted may be those exemplified in terms of the ring A.

The organic group, expressed by $Y^1$ or $Y^2$, having a carbon number of 1 to 30 may be properly selected depending on the application; examples thereof include alkyl groups such as methyl, ethyl, propyl, isopropyl, butyl, sec-butyl, tert-butyl, isobutyl, amyl, isoamyl, tert-amyl, hexyl, cyclohexyl, cyclohexylmethyl, 2-cyclohexylethyl, heptyl, isoheptyl, tert-heptyl, n-octyl, isooctyl, tert-octyl, 2-ethylhexyl, nonyl, isononyl, decyl, dodecyl, tridecyl, tetradecyl, pentadecyl, hexadecyl, heptadecyl and octadecyl; alkenyl groups such as vinyl, 1-methylethenyl, 2-methylethenyl, propenyl, butenyl, isobutenyl, pentenyl, hexenyl, heptenyl, octenyl, decenyl, pentadecenyl and 1-phenylpropene-3-yl; alkylaryl groups such as phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl and cyclohexylphenyl; arylalkyl groups such as benzyl, phenethyl, 2-phenylpropane-2-yl, diphenylmethyl, triphenylmethyl, styryl and cinnamyl; and also these hydrocarbon groups with an intervening ether or thioether group, such as 2-methoxyethyl, 3-methoxypropyl, 4-methoxybutyl, 2-butoxyethyl, methoxyethoxyethyl, methoxyethoxyethoxyethyl, 3-methoxybutyl, 2-phenoxyethyl, 2-methylthioethyl and 2-phenylthioethyl; these groups may be further substituted by an alkoxy, alkenyl, nitro or cyano group, or halogen atoms, and the like.

In cases where the $Y^1$ and $Y^2$ are of larger substituents, the cyanine compounds of the present invention may be of lower molar absorption coefficient and possibly affect the sensitivity, therefore, $Y^1$ and $Y^2$ are preferably hydrocarbon groups of carbon number 1 to 8, more preferably alkyl groups of carbon number 1 to 8.

As for the anions expressed by $An^{m-}$, monovalent anions are exemplified by halogen anions such as chlorine anion, bromine anion, iodine anion and fluorine anion; inorganic anions such as perchloric acid anion, chloric acid anion, thiocyanic acid anion, hexafluorophosphorus anion, hexafluoroantimony anion and tetrafluoroboron anion; organic sulfonic acid anions such as benzenesulfonic acid anion, toluenesulfonic acid anion, trifluoromethanesulfonic acid anion, diphenylamine-4-sulfonic acid anion, 2-amino-4-methyl-5-chlorobenzene sulfonic acid anion and 2-amino-5-nitrobenzene sulfonic acid anion; organic phosphoric acid anions such as octyl phosphoric acid anion, dodecyl phosphoric acid anion, octadecyl phosphoric acid anion, phenyl phosphoric acid anion, nonylphenyl phosphoric acid anion and 2,2'-methylenebis(4,6-di-tert-butylphenyl)phosphoric acid anion; divalent anions are exemplified by benzenedisulfonic acid anion and naphthalene disulfonic acid anion.

In addition, such anions may also be employed optionally, as quencher anions that function to de-activate or quench an excited molecule or metallocene anions such as ferrocenes and ruthenocenes that have an anionic group like carboxyl, phosphonic acid, or sulfonic acid group on cyclopentadienyl rings.

The cyanine compounds, expressed by General Formula (I), may be produced by a conventional process, for example, described in JP-A No. 2005-54150.

The optical recording medium according to the present invention comprises at least one squarylium compound selected from those expressed by the Structural Formula (II); among these, aluminum complex of squarylium compounds having a benzyl group at 3-position of an indolinium group are particularly preferable in view of less cross talk. In the Formula (II) described above, $R^7$ and $R^8$ may be identical or different each other, and each represent an alkyl group that may have substituent(s), an aralkyl group that may have substituent(s), an aryl group that may have substituent(s), or a heterocyclic group that may have substituent(s); Q represents a metal atom capable of coordinating; "t" is an integer of 2 or 3; $R^9$ and $R^{10}$ each represent an alkyl group that may have substituent(s), an aralkyl group that may have substituent(s), or an aryl group that may have substituent(s); $R^9$ and $R^{10}$ may bind each other to form a cycloaliphatic hydrocarbon ring or heterocyclic ring.

$R^5$ represents a hydrogen atom, an alkyl group that may have substituent(s), an aralkyl group that may have substituent(s), or an aryl group that may have substituent(s); $R^6$ represents a halogen atom, an alkyl group that may have substituent(s), an aralkyl group that may have substituent(s), or an aryl group that may have substituent(s); a nitro group, a cyano group, or an alkoxy group that may have substituent(s); "s" represents an integer of 0 to 4. In cases where "s" represents an integer of 2 to 4, the respective $R^6$ may be identical or different each other, and adjacent two $R^6$s may bind with adjacent two carbon atoms to form an aromatic ring that may have substituent(s).

It is particularly preferred that Q is aluminum, $R^8$ is a phenyl group, and/or $R^7$ is a halogen-substituted or unsubstituted alkyl group. It is preferred that $R^7$ is an alkyl group with a branched chain, and $R^7$ is trifluoromethyl or an isopropyl group.

It is preferred that $R^9$ and $R^{10}$ are each an unsubstituted aralkyl or an unsubstituted alkyl group, more preferably a benzyl group or methyl group. It is preferred that two $R^6$s form a naphthyl group together with benzene rings.

As for the substituents in the Structural Formula (II), the alkyl moiety in the alkyl and alkoxy groups described above may be linear or branched alkyl groups with a carbon number of 1 to 6 or cyclic alkyl groups with a carbon number of 3 to 8; example thereof include methyl, ethyl, propyl, isopropyl, butyl, isobutyl, sec-butyl, tert-butyl, pentyl, isopentyl, 1-methylbutyl, 2-methylbutyl, tert-pentyl, hexyl, cyclopropyl, cyclobutyl, cyclopentyl, cyclohexyl, cycloheptyl and cyclooctyl groups.

The aralkyl groups are preferably those of carbon number 7 to 19, more preferably 7 to 15; examples thereof include benzyl, phenetyl, phenylpropyl and naphthylmethyl groups.

The aryl groups are preferably those of carbon number 6 to 18, more preferably 6 to 14; examples thereof include phenyl, naphthyl, anthryl, and azulenyl groups. The halogen atoms may be chlorine, bromine, fluorine, or iodine atoms.

The metal atom Q capable of coordinating may be, for example, aluminum, zinc, copper, iron, nickel, chromium, cobalt, manganese, iridium, vanadium and titanium. In particular the inventive optical recording media that comprise squarylium compounds, forming an aluminum complex, may exhibit excellent optical properties.

The cycloaliphatic hydrocarbon ring, formed from $R^9$ and $R^{10}$ described above, may be those having a carbon number of 3 to 10 of saturated or unsaturated ones; examples thereof include cyclopropane ring, cyclobutane ring, cyclopentane ring, cyclohexane ring, cycloheptane ring, cyclooctane ring, cyclononane ring, cyclodecane ring, cyclopentene ring, 1,3-cyclopentadiene ring, cyclohexane ring and cyclohexadiene ring.

The aromatic ring, formed from adjacent two $R^6$s and adjacent two carbon atoms, are preferably those having a carbon number of 6 to 14; examples thereof include benzene, naphthalene ring.

The heterocycles of the heterocyclic rings described above and the heterocyclic ring, formed from $R^9$ and $R^{10}$ bound each other described above, may be five-membered or six-membered monocyclic aromatic or cycloaliphatic heterocyclic rings including at least one of nitrogen, oxygen, and sulfur atoms, or and dicyclic or tricyclic condensed aromatic or cycloaliphatic heterocyclic rings of condensed three to eight rings including at least one of nitrogen, oxygen and sulfur atoms. Specific examples thereof include pyridine ring, pyradine ring, pyrimidine ring, pyridazine ring, quinoline ring, isoquinoline ring, phthalazine ring, quinazoline ring, quinoxaline ring, naphthyridine ring, cinnoline ring, pyrrole ring, pyrazole ring, imidazole ring, triazole ring, tetrazole ring, thiophene ring, furan ring, thiazole ring, oxazole ring, indole ring, isoindole ring, indazole ring, benzoimidazole ring, benzotriazole ring, benzothiazole ring, bezooxazole ring, purine ring, carbazole ring, pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoquinoline ring, tetrahydrofuran ring, tetrahydropyran ring, dihydrobenzofuran ring and tetrahydrocarbazole ring.

The above-noted substituents of aralkyl, aryl, alkoxy, or heterocyclic groups, or aromatic rings formed from adjacent two $R^6$s and adjacent two carbon atoms may be one to five substituents that are identical or different, and are exemplified by hydroxyl, carboxyl, alkyl, alkoxy, nitro, and substituted or unsubstituted amino groups, and halogen atoms. Specific examples of the alkyl or alkoxy groups and halogen atoms are those described above.

The above-noted substituents of alkyl groups may be one to three substituents that are identical or different, and are exemplified by hydroxyl, carboxyl, alkoxy groups, and halogen atoms. Specific examples of the alkoxy groups and halogen atoms may be those described above.

The above-noted substituents of amino groups may be one or two alkyl groups that are identical or different; specific examples of the alkyl groups may be those described above.

The squarylium compounds, expressed by General Formula (II), may be produced by a conventional process, for example, described in JP-A No. 2004-244342.

It is preferred that the weight ratio of the cyanine compound and the squarylium compound is about 2/8 to 8/2 in the dye recording layer, except for other ingredients.

In cases where the weight ratio of the cyanine compound is 8/2 or more, the reflectance is likely to be excessively low, since the absorption comes to unduly large at the recording/regenerating wavelength under the effect of the cyanine compound having larger absorption wavelengths; in addition, thermal resistance is likely to degrade, thus impairing preservation reliability at higher temperatures after recording. In cases where the weight ratio of the squarylium compound is 8/2 or more, the higher decomposition temperatures tend to degrade recording sensitivity, and also the marks may easily spread over adjacent tracks at recording under higher temperatures, thus the jitter tends to degrade, and disturbing proper recording properties.

The film thicknesses of the first and the second dye recording layers are each typically 30 to 150 nm. In cases of below 30 nm, the contrast is likely to be insufficient, and the modulation is likely to be low. On the other hand, in cases of above 150 nm, it is possibly difficult to write small recording marks.

When high-density recordings are carried out such as 0.5 µm or less of minimum mark length, the film thickness is preferably 40 to 90 nm. In cases where the film thickness is below 40 nm, the reflectance tends to be unduly low and the film thickness is likely to be uneven; on the other hand, in cases of above 90 nm, the heat capacity comes to large, which possibly resulting in poor recording sensitivity, nonuniform thermal conductivity and disarrayed edges, and higher jitter.

It is preferred that the film thickness of the second dye recording layer is about 1.0 to 2.0 times of that of the first dye recording layer. When the film thicknesses of the dye recording layers is out of this range, it may be difficult to record on the both layers with a certain recording strategy (irradiating pulse pattern of recording laser) due to different spreading tendencies of recording marks.

The dye recording layer may be properly formed in the present invention; in general, the layer is formed by a wet-coating process, i.e. basic ingredients are dissolved into an organic solvent such as lower alcohols, ether alcohols, ketones, esters, acrylate esters, fluorinated alcohols, hydrocarbons, and chlorinated hydrocarbons, then the solution is coated on a substrate by spin coating, spraying, dipping process etc.

The spin coating processes may provide substantially uniform dye recording layers; the subsequent recording may provide the layers or substrates with deformations or perforations, which in turn provide different reflectance and thus possibility to read recording marks. The difference of the reflectance is no less than 5% between before and after the recording. When a dye recording layer is formed on a substrate with guide grooves, the thickness of die film is different between the groove and inter-groove portions.

The dye recording layer may optionally contain dye compounds such as cyanine, azo and phthalocyanine compounds, and also the other ingredients such as polymers, stabilizers, dispersants, flame retardants, lubricants, antistatic agents, surfactants, plasticizers, radical scavengers, antioxidants, light-resistant agents etc.

An inorganic protective layer is provided between the second dye recording layer and the intermediate layer in order to protect the dye recording layer from chemical and/or physical attacks.

The material of the inorganic protective layer may be oxides such as silicon oxide, indium oxide, tin oxide, zinc oxide, gallium oxide, niobium oxide, aluminum oxide, magnesium oxide and tantalum oxide; metalloids or semiconductors such as silicon, germanium, silicon carbide, titanium carbide and graphite; fluorides such as magnesium fluoride, aluminum fluoride, lanthanum fluoride and selenium fluoride; sulfides such as zinc sulfide, cadmium sulfide and antimony sulfide; nitrides such as silicon nitride and aluminum nitride; chalcogenides such as ZnSe, GaSe and ZnTe, and any combinations of two or more thereof.

From the viewpoint of lower internal stress of the inorganic protective layer, preferable materials are zinc sulfide, cadmium sulfide, antimony sulfide and silicon oxide. A mixture of these substances may be employed so as to optimize refractive index "n" and absorption coefficient "k". The "n" and "k" in a mixture of two or more materials correspond approximately to those calculated from a weighted mean method, provided that the materials each have a sufficiently high melting point enough to avoid their sintering of spattering targets.

Among others, zinc sulfide that exhibits lower toxicity, higher spattering grade, and lower cost may lead to higher productivity and lower production cost. The content of the zinc sulfide is preferably 60 to 95% by mole; when the content is above 95% by mole, a thin film is hardly obtainable since the resulting film tends to recrystallize at sputtering thereof on the second dye recording layer.

When the refractive index "n" is to be adjusted, it is preferred that the zinc sulfide of 95% by mole or less and one or more of other substances with different refractive index are blended.

When a thin film of blended substances is to be formed, simultaneous sputtering of plural targets is disadvantageous, although not impossible, in view of higher system cost and complicated control of the process, as such, it is advantageous that a mixture of zinc sulfide and an additional substance is prepared as a target material for sputtering.

Various mixtures of zinc sulfide with a refractive index "n" of about 2.35 and silicon oxide with a lower refractive index may provide targets for producing CD-RWs, DVD-RWs and DVD+RWs that are currently commercially available.

Moreover, addition of transparent conductive oxides such as indium oxide, zinc oxide, gallium oxide, tin oxide, niobium oxide and $InCaO_3(ZnO)_m$ (m: natural number) to the target may provide the target with a conductivity to allow DC spattering, which contributing to production-tact shortening and production-cost reduction by virtue of higher sputtering grade.

In order to employ the DC sputtering, specific resistance of the target is required to be no more than 1.0 ohm·cm. When the specific resistance is as low as 0.1 ohm·cm or less, no problem generates in relation to ark development even when higher sputtering power being applied, thus the productivity may be favorably improved. More preferably, the specific resistance is as low as 0.01 ohm·cm or less, by reason that no ark-cut device or pulse-duplicating system is required for sputtering power sources, which reducing still more the cost of production system. However, higher contents of the additional substance may bring about higher film stress, which possibly resulting in separation between the dye recording layer and the inorganic protective layer; as such, the content of the additional substance is typically up to 30% by mole.

It is preferred that the thickness of the inorganic protective layer is 3 to 40 nm. When the thickness is below 3 nm, defects of the protective layer may allow permeation of intermediate-layer material into the second dye recording layer, affecting the dye therein.

When dyes are to be removed from outer regions of inorganic protective layers or substrate edges after forming the inorganic protective layer, it is preferred that the thickness of the inorganic protective layer is no more than 5 nm since lower alcohols with lower viscosities are typically used for the solvent.

Figure 4:
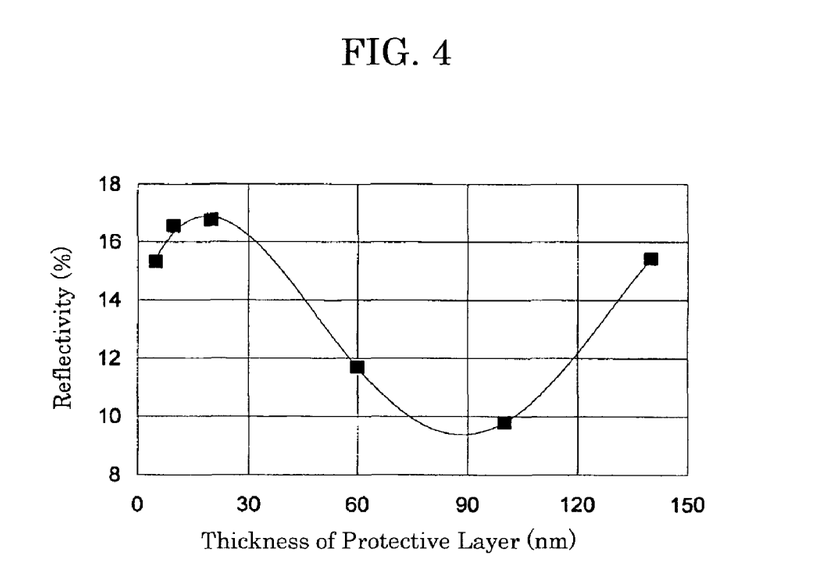
FIG. 4 is a graph that shows a relation between thickness of a protective layer and reflectance.
Figure 5:
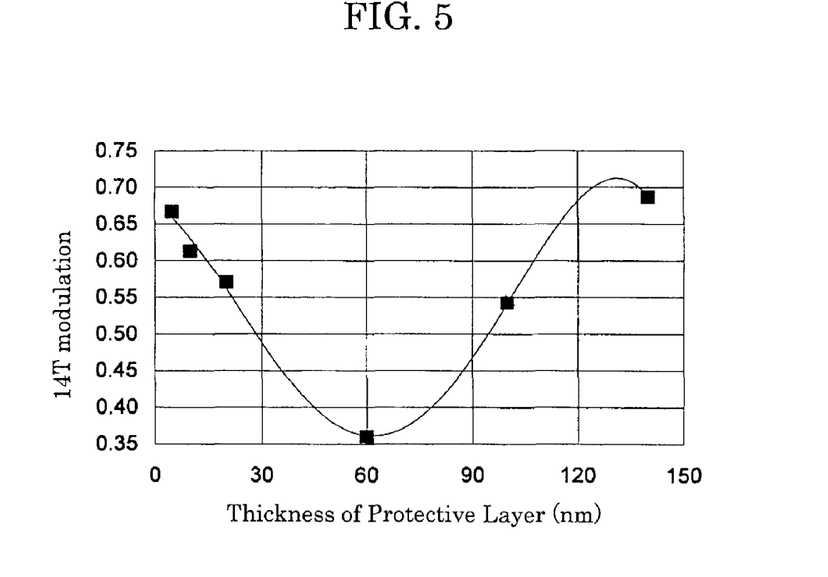
FIG. 5 is a graph that shows a relation between thickness of a protective layer and modulation degree.

When materials with higher refractive index of about 2.0 to 2.3 are employed for the material of the protective layer, optical interference induces dependency of refractive indices on film thickness of the inorganic protective layer in a periodic manner as shown in FIG. 4, thus the film thickness is preferably no more than 50 nm. Similarly, optical interference typically induces dependency of modulation degree after recording on film thickness of the inorganic protective layer in a periodic manner as shown in FIG. 5, thus the film thickness is preferably no more than 40 nm. In addition, when the absorption coefficient "k" of the inorganic protective layer is other than zero, optical absorption inevitably decreases the refractive index of the second information recording layer, thus the "k" is preferably as low as possible.

The material of the first and the second substrates may be polycarbonate resins, acrylic resins, epoxy resins, polystyrene resins, acrylonitrile-styrene copolymer resins, polyethylene resins, polypropylene resins, silicone resins, fluorine resins, ABS resins, urethane resins, and transparent glasses; preferable materials are polycarbonate resins and acrylic resins in view of superior optical properties and lower cost.

The first and the second substrates are typically provided with grooves having a pitch of 0.8 μm or less to guide recording/regenerating light. The grooves are not necessarily required to be geometrically rectangular or trapezoidal, that is, may be optical grooves with different refractive indices such as waveguides formed by ion injection processes, for example.

The thicknesses of the first and second substrates are typically different in order to take a chroma aberration depending on lens numerical aperture (NA) of evaluating pickups. When the NA is 0.6 to 0.65, the thicknesses are preferably about 0.6 mm.

The groove shapes are also different between the first and second substrates. In cases of DVD+Rs and DVD-Rs with 4.7 GB and 0.74 μm pitch, it is preferred for the first substrate that the groove depth is 1000 to 2000 angstroms and the groove depth is 0.2 to 0.3 μm at the bottom. These ranges are preferable for making use of interface reflection from the viewpoint that dyes tend to be filled into grooves under spin coating processes, and interfacial configuration between dye recording layers and light reflective layers depends on the filled amount of dyes and groove shape.

On the other hand, it is preferred for the second substrate that the groove depth is 200 to 600 angstroms and the groove depth is 0.2 to 0.4 μm. These ranges are preferable for making use of interface reflection from the viewpoint that interfacial configuration between dye recording layers and light reflective layers depends on the groove shape.

Both of the first and seconds substrates have a tendency that the deeper depths than the range described above lead to lower refractive indices. In addition, the shallower width compared to or groove width outside the ranges described above possibly makes unstable the tracking on recording, resulting in nonuniform recording marks and higher jitter.

The optical recording medium according to the present invention has a construction that higher refractive indices are induced by multiple interference effect at both interfaces of dye recording layers, similarly as DVD+Rs and CD-Rs, thus the dye recording layer is necessary to have such optical properties that the refractive index "n" is higher and the absorption coefficient "k" is lower in the complex refractive index (n–ik) at the recording/regenerating wavelength λ.

As for the range of "n" and "k", "n" is above 2.0, "k" is above 0.02 and below 0.2, preferably "n" is 2.2 to 2.8 and "k" is 0.03 to 0.07. In cases where "k" is below 0.02, the sensitivity is likely to be poor due to lower absorption of recording laser light, and in cases where "k" is above 0.2, the refractive index tends to be low, thus the refractive index of dye recording layer at back side, viewed from incident light side, is difficult to be kept sufficiently high when there are two dye recording layers.

Such optical properties may be attained by making use of the properties at longer wavelength end of optical absorption band of dye films. The inventive optical recording media are suited to red laser lights of 600 to 800 nm, and the preferable range of the recording/regenerating wavelength λ is 650 to 670 nm. In the design of the inventive optical recording media, the wavelength of the laser light for recording/regenerating is initially defined, then the materials and film thicknesses are selected so as to satisfy the requirements defined in the present invention.

The materials of the light reflective layer and the translucent reflective layer are selected from those having higher refractive indices for the laser lights; examples thereof include metals and metalloids such as Au, Ag, Cu, Al, Ti, V, Cr, Ni, Nd, Mg, Pd, Zr, Pt, Ta, W, Si, Zn and In.

Among these materials, such alloys are preferable that contain one main ingredient selected from Au, Ag, Cu and Al and at least one additional ingredient, in an amount of 0.2 to 5.0% by mass, selected from Au, Ag, Cu, Al, Ti, V, Cr, Ni, Nd, Mg, Pd, Zr, Pt, Ta, W, Si, Zn and In of other than the main ingredient. The additional ingredient in an amount of 0.2% by weight or more may bring about a thin film with finer crystallite size and excellent corrosion resistance; however, additional amount of above 5% by mass is unfavorable since reflective indices are lowered.

The film thickness of the light reflective layer is preferably 80 to 200 nm, more preferably no less than 100 nm for presenting sufficiently high refractive indices. The thickness of the optical reflective layer is preferably higher in view of improving the heat dissipation of the second information recording layer; however, the thickness above 200 nm typically leads to time-consuming and expensive material cost thus is undesirable in view of production cost, and also microscopic flatness of film surface is likely to degrade.

The translucent reflective layer is tailored to have a transmittance of 30% to 60% and a reflectance of 15% to 30% so as to make the laser light arrive sufficiently at the second dye recording layer. The thickness of the translucent reflective layer is preferably 5 to 30 nm.

In cases where the first dye recording layer and the transparent intermediate layer, of an acrylic resin etc., are contacted through the translucent reflective layer having a film thickness of as thin as no more than 30 nm, the dye and the acrylic resins are required to be far from their compatibility derived from permeation through the translucent reflective layer. For example, when the translucent reflective layer is formed from materials with larger crystallite size such as pure metal thin film, the thin film tends to represent an island-shaped configuration that possibly allows permeation through grain boundary, therefore, a countermeasure may be provided optionally in such cases.

EXAMPLES

The present invention will be explained more specifically with reference to Examples, to which the present invention in no way being limited. For example, optical recording media were evaluated at eight times recording/regenerating condition of DVD (linear velocity: 30.6 m/sec); this velocity may be increased still more depending on higher velocity design.

Figure 1:
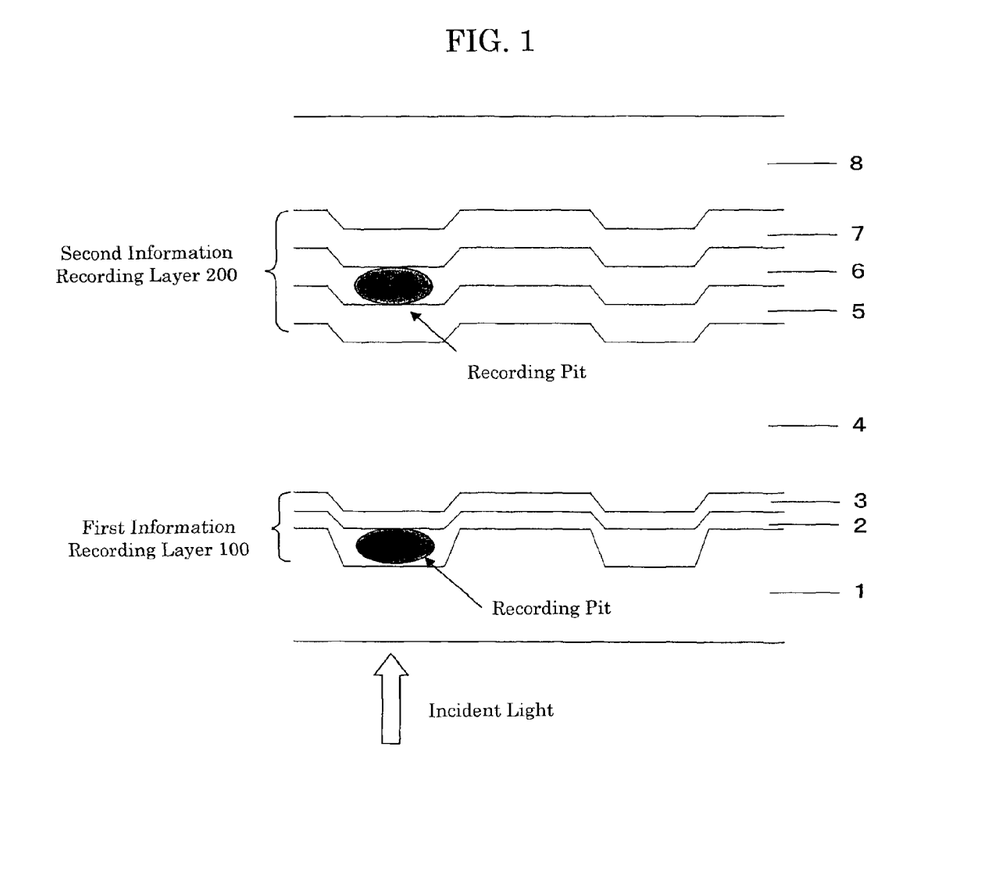
FIG. 1 is a schematic cross-section that shows exemplarily a layer construction of an optical recording medium according to the present invention.

FIG. 1 is a schematic cross-section of an exemplary layer construction in an inventive optical recording medium, showing such construction as "first substrate 1/first dye recording layer 2/translucent light reflective layer 3/intermediate layer 4/inorganic protective layer 5/second dye recording layer 6/light reflective layer 7/second substrate 8".

The first information recording layer 100 is formed of the first dye recording layer 2 and the translucent light reflective layer 3, and the second information recording layer 200 is formed of the inorganic protective layer 5, the second dye recording layer 6 and the light reflective layer 7.

The first information recording layer is provided properly with a reflectance and a modulation degree of recording signals (contrast), on the basis of multiple interference effect at both interfaces of the first dye recording layer as well as deformation of the first substrate at forming the marks, by virtue of the construction that single panels are removed from conventional single information-recording-layer media (DVD+R, DVD-R etc.) that are formed by laminating a first substrate, having a first dye recording layer and a translucent reflective layer, with a second substrate. The second information recording layer is provided properly with a necessary reflectance and a modulation degree of recording signals (contrast) on the basis of groove shape of the substrate and optical absorption properties of dyes, and dye elution by organic resins is prevented and mark shape is arranged by virtue of disposing the transparent protective layer between the second dye recording layer and the transparent intermediate layer 4 formed of organic resins etc.

Example 1

A coating liquid containing a squarylium compound of Compound (1) shown below dissolved in 2,2,3,3-tetrafluoropropanol was spin-coated on a polycarbonate substrate of 0.57 mm thick having concave grooves of 160 nm deep, 0.25 μm wide at bottom and 0.74 μm track-pitch to thereby form a first dye recording layer of about 40 nm thick.

Then an Ag alloy with 0.5 atom % of In was sputtered on the first dye recording layer to form a translucent reflective layer of 9 nm thick, thereby to form a first information substrate having a first information recording layer.

Thereafter, an Ag light reflective layer of 120 nm thick was formed by sputtering on a polycarbonate substrate of 0.60 mm thick having convex grooves of 34 nm deep, 0.25 μm wide at bottom and 0.74 μm track-pitch, then onto which a coating liquid, containing a cyanine dye of Compound (2) shown below and a squarylium compound of Compound (3) shown below dissolved in 2,2,3,3-tetrafluoropropanol in an weight ratio of 6/4 of Compound (2)/Compound (3), was spin-coated thereby to form a second dye recording layer of about 60 nm thick.

Then an inorganic protective layer of 10 nm thick, containing 80 mole % of ZnS and 20 mole % of $SiO_2$, was formed on the second dye recording layer thereby to form a second information substrate having a second information recording layer.

Figure 2:
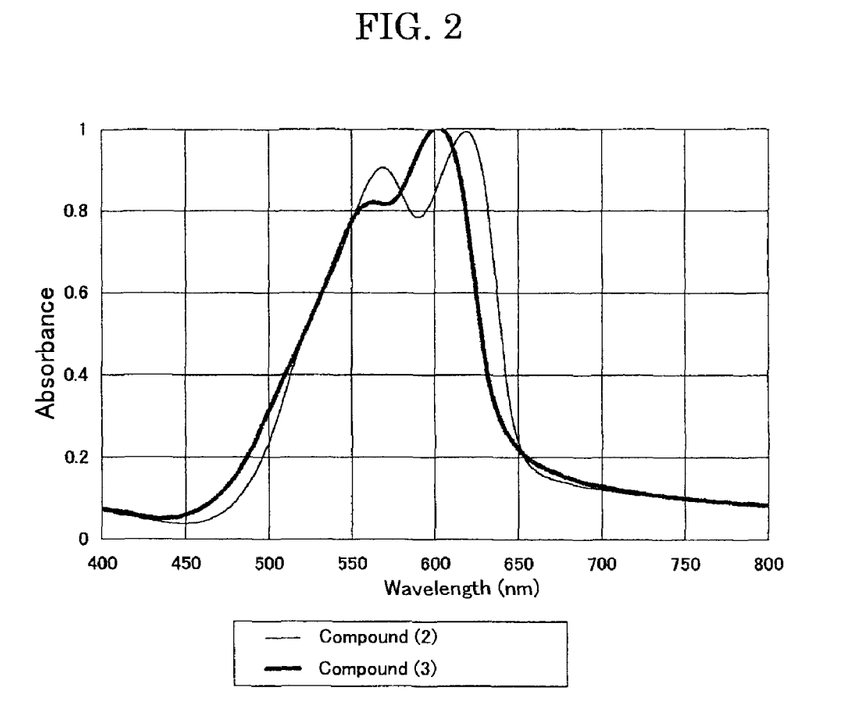
FIG. 2 is optical absorption spectra of compounds adapted to the present invention.

Thereafter, the resulting first and second information substrates were laminated using a UV curable adhesive (KARAYAD DVD576M, by Nippon Kayaku Co.) with an intermediate layer of about 50 μm thick thereby to prepare an optical recording medium. The thermal decomposition temperatures of Compounds (1) to (4) and λmax of thin films are shown in Table 1. The optical absorption spectra of Compounds (2) and (3) are shown in FIG. 2.

TABLE 1

|  | Thermal Decomposition Temperature ° C. | λmax (nm) of Thin Film |
|---|---|---|
| Compound (1) | 289 | 607 |
| Compound (2) | 229 | 619 |
| Compound (3) | 300 | 601 |
| Compound (4) | 247 | 573 |

Example 2

In a similar manner as Example 1, a coating liquid of a squarylium compound of Compound (1) dissolved in 2,2,3,3-tetrafluoropropanol was spin-coated on a polycarbonate substrate of 0.57 mm thick having concave grooves of 160 nm deep, 0.25 μm wide at bottom and 0.74 μm track-pitch to thereby form a first dye recording layer of about 40 nm thick. Then an Ag alloy with 0.5 atom % of In was sputtered on the first dye recording layer to form a translucent reflective layer of 9 nm thick, thereby to form a first information substrate having a first information recording layer.

Thereafter, an Ag light reflective layer of 120 nm thick was formed by sputtering on a polycarbonate substrate of 0.60 mm thick having convex grooves of 34 nm deep, 0.25 μm wide at bottom and 0.74 μm track-pitch, then onto which a coating liquid, containing a cyanine dye of Compound (2) and a squarylium compound of Compound (4) shown below dissolved in 2,2,3,3-tetrafluoropropanol in an weight ratio of 6/4 of Compound (2)/Compound (4), was spin-coated thereby to form a second dye recording layer of about 60 nm thick.

Compound (4)

Then an inorganic protective layer of 10 nm thick, containing 80 mole % of ZnS and 20 mole % of $SiO_2$, was formed on the second dye recording layer thereby to form a second information substrate having a second information recording layer.

Thereafter, the resulting first and second information substrates were laminated using a UV curable adhesive (KARAYAD DVD576M, by Nippon Kayaku Co.) with an intermediate layer of about 50 μm thick thereby to prepare an optical recording medium.

Figure 3:
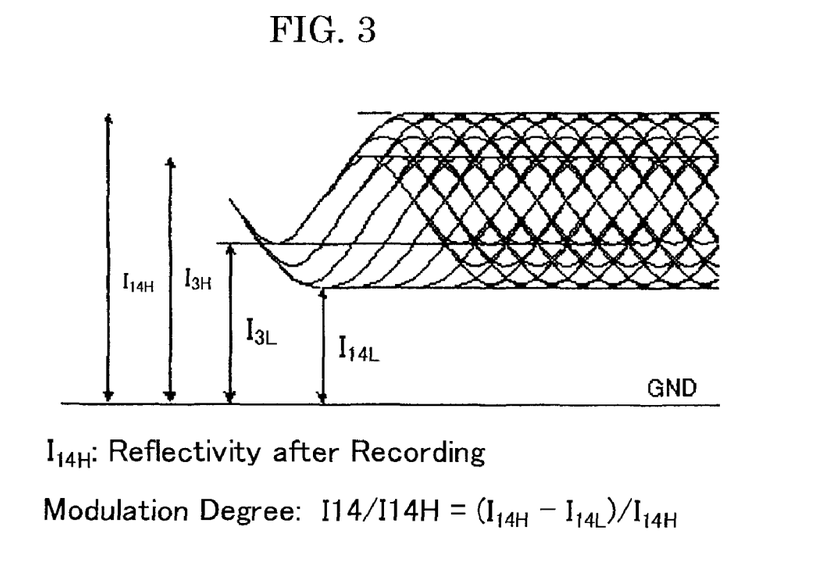
FIG. 3 is a schematic view that shows regenerating signals after recording.

DVD (8-16) signals were recorded on the second information recording layer of the optical recording medium in Example 1 by use of ODU1000 (wavelength: 657 nm, NA: 0.65, by Pulstec Industrial Co.) under a linear velocity of 30.64 m/s (8 times recording) then were evaluated by regenerating at 3.83 m/s; consequently, the reflectance was 19% and modulation degree I14/I14H ((I14H−I14L)/I14H in FIG. 3) was 65%.

The power margin ((P2−P1)×2/(P2+P1), P1: power lower limit at 9% or less of jitter, P2: power upper limit thereof was 20%.

In addition, a number of optical recording media were prepared while changing the mixing ratio W1/(W1+W2) of Compounds (2) and (3) from 0.0 to 1.0 in a similar manner as Example 1. The resulting optical recording media were subjected to recording, then evaluated in terms of errors under various periods of preservation at 80° C. and 85% RH; consequently, those having the ratio W1/(W1+W2) of 0.8 or more brought about uncorrectable errors after 150 hours of the preservation.

On the other hand, the mixing ratio W1/(W1+W2) of 0.2 or less tends to degrade the recording sensitivity and to increase errors for those recorded at a linear velocity of 9.2 m/sec (2.4 times velocity).

DVD (8-16) signals were recorded on the second information recording layer of the optical recording medium in Example 2 by use of ODU1000 (wavelength: 657 nm, NA: 0.65, by Pulstec Industrial Co.) under a linear velocity of 45.96 m/s (12 times recording) then were evaluated by regenerating at 3.83 m/s; consequently, the reflectance was 19% and modulation degree I14/I14H ((I14H−I14L)/I14H in FIG. 3) was 63%.

The power margin ((P2−P1)×2/(P2+P1), P1: power lower limit at 9% or less of jitter, P2: power upper limit thereof) was 15%.

In addition, a number of optical recording media were prepared while changing the mixing ratio W1/(W1+W2) of Compounds (2) and (4) from 0.0 to 1.0 in a similar manner as Example 1. The resulting optical recording media were subjected to recording, then evaluated in terms of errors under various periods of preservation at 80° C. and 85% RH; consequently, those having the ratio W1/(W1+W2) of 0.8 or more brought about uncorrectable errors after 150 hours of the preservation.

On the other hand, the mixing ratio W1/(W1+W2) of 0.2 or less tends to degrade the recording sensitivity and to increase errors for those recorded at a linear velocity of 9.2 m/sec (2.4 times velocity).

The invention claimed is:

1. An optical recording medium comprising, in sequence:
a first substrate; a first information recording layer; an intermediate layer; a second information recording layer; and a second substrate having wobble convex portions on a surface of the second substrate facing the second information recording layer,
wherein information is recorded on or reproduced from the first information recording layer and second information recording layer by irradiation with a laser beam from a side of the information recording layer facing the first substrate,
wherein the second information recording layer includes, over the second substrate, a light reflective layer, a dye recording layer, and an inorganic protective layer,
wherein the inorganic protective layer has a thickness of 3 nm to 40 nm, and
wherein the dye recording layer includes a cyanine compound expressed by General Formula (I) and a squarylium compound expressed by General Formula (II):

General Formula (I)

pAn$^{m-}$ in which, ring A and ring B are each a benzene ring or a naphthalene ring that may have substituent(s); among $R^1$ to $R^4$, adjacent two groups of $R^1$ and $R^2$, $R^2$ and $R^4$, or $R^3$ and $R^4$ are a benzyl group or all of $R^1$ to $R^4$ are each a benzyl group, and in the former case, the other two groups of $R^1$ to $R^4$ are each an alkyl group having 1 to 4 carbon atoms or connect to each other to form a three- to six-membered ring; $Y^1$ and $Y^2$ are each independently an organic group with a carbon number of 1 to 30; $An^{m-}$ represents an anion with a valency of "m", and the "m" is an integer of 1 or 2, "p" is a factor for neutralization:

General Formula (II)

in which, $R^5$ represents a hydrogen atom, an alkyl group that may have substituent(s), an aralkyl group that may have substituent(s), or an aryl group that may have substituent(s); $R^6$ represents a halogen atom, an alkyl group that may have substituent(s), an aralkyl group that may have substituent(s), an aryl group that may have substituent(s), a nitro group, a cyano group, or an alkoxy group that may have substituent(s); "s" represents an integer of 0 to 4, when "s" represents an integer of 2 to 4, the respective $R^6$s may be identical or different each other, and adjacent two $R^6$s may bind with adjacent two carbon atoms to form an aromatic ring that may have substituent(s); $R^7$ and $R^8$ are each a group selected independently from the group consisting of alkyl groups that may have substituent(s), aralkyl groups that may have substituent(s), aryl groups that may have substituent(s), and heterocyclic groups that may have substituent(s); $R^9$ and $R^{10}$ are each a group selected independently from the group consisting of alkyl groups that may have substituent(s), aralkyl groups that may have substituent(s), and aryl groups that may have substituent(s), $R^9$ and $R^{10}$ may bind to each other to form a cycloaliphatic hydrocarbon ring or a heterocyclic ring; Q represents a metal atom capable of coordinating; "t" is an integer of 2 or 3.

2. The optical recording medium according to claim 1, wherein the amount (W1) of the cyanine compound expressed by General Formula (I) and the amount (W2) of the squarylium compound expressed by General Formula (II) satisfy the following relation: 0.2<W1/(W1+W2)<0.8.

3. The optical recording medium according to claim 1, wherein the thermal decomposition temperature of the cyanine compound is 200° C. to 240° C., and the thermal decomposition temperature of the squarylium compound is 240° C. to 300° C.

4. The optical recording medium according to claim 1, wherein the maximum absorption wavelength λmax of the cyanine compound is 610 nm to 630 nm, and the λmax of the squarylium compound is 560 nm to 620 nm.

5. The optical recording medium according to claim 1, wherein the main ingredient of the inorganic protective layer is zinc sulfide.

6. The optical recording medium according to claim 5, wherein the inorganic protective layer comprises a transparent conductive oxide.

7. The optical recording medium according to claim 6, wherein the transparent conductive oxide is at least one of indium oxide, zinc oxide, gallium oxide, tin oxide, niobium oxide and $InCaO_3(ZnO)_m$ wherein "m" is a natural number.

8. The optical recording medium according to claim 1, wherein the light reflective layer is formed from Ag or Ag alloys, and has a thickness of 80 nm to 200 nm.

9. The optical recording medium according to claim 1, wherein the recording of information on the second information recording layer by use of the laser beam deforms the interface between the dye recording layer and the inorganic protective layer at the sites corresponding to pits of the second information recording layer.

* * * * *